US012614368B2

(12) United States Patent
Lee et al.

(10) Patent No.: US 12,614,368 B2
(45) Date of Patent: Apr. 28, 2026

(54) IMAGE PROCESSING DEVICE AND IMAGE PROCESSING METHOD

(71) Applicant: SK hynix Inc., Icheon-si (KR)

(72) Inventors: Joo Young Lee, Icheon-si (KR); Jong Hyun Bae, Icheon-si (KR); Dae Hyun Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 344 days.

(21) Appl. No.: 18/339,835

(22) Filed: Jun. 22, 2023

(65) Prior Publication Data

US 2024/0203089 A1     Jun. 20, 2024

(30) Foreign Application Priority Data

Dec. 19, 2022     (KR) ........................ 10-2022-0178124

(51) Int. Cl.
*G06V 10/56*          (2022.01)
*G06T 7/13*           (2017.01)
*G06T 7/90*           (2017.01)
*G06V 10/74*          (2022.01)
*G06V 10/75*          (2022.01)

(52) U.S. Cl.
CPC ................ *G06V 10/56* (2022.01); *G06T 7/13* (2017.01); *G06T 7/90* (2017.01); *G06V 10/751* (2022.01); *G06V 10/761* (2022.01); *G06T 2207/10024* (2013.01)

(58) Field of Classification Search
CPC .... G06V 10/56; G06V 10/761; G06V 10/751; G06T 7/13; G06T 7/90; G06T 2207/10024
USPC ........................................................ 382/162
See application file for complete search history.

(56) References Cited

U.S. PATENT DOCUMENTS

| | | | | |
|---|---|---|---|---|
| 2008/0075393 A1* | 3/2008 | Kwon | .................. | H04N 23/843 |
| | | | | 382/300 |
| 2012/0200733 A1* | 8/2012 | Utsugi | ................. | H04N 23/843 |
| | | | | 348/E9.051 |
| 2021/0217134 A1 | 7/2021 | Okamura | | |

FOREIGN PATENT DOCUMENTS

KR     1020210148822 A     12/2021

OTHER PUBLICATIONS

NPL: 2010-2024.*
NPL: search by IP.com and IEEE, Results Publication Date Range: Mar. 16, 2004 to Oct. 14, 2025.*

* cited by examiner

*Primary Examiner* — Quang N Vo
(74) *Attorney, Agent, or Firm* — WILLIAM PARK AND ASSOCIATES LTD.

(57)     ABSTRACT

An image processor, and an image processing method, includes an acquirer configured to acquire first pixel data from a first pixel group corresponding to a first color, and acquire second pixel data and third pixel data from a second pixel group and a third pixel group, respectively, which are arranged on both sides of the first pixel group and correspond to a second color. The image processor also includes a determiner configured to determine one of second pixel data and third pixel data as interpolation reference data using different schemes depending on a type of edge detected based on a difference in the first color and the second color in an image region corresponding to the first pixel data. The image processor further includes an interpolator configured to interpolate a part of the first pixel data to correspond to the second color based on interpolation reference data.

20 Claims, 14 Drawing Sheets

FIG. 4

FIRST PIXEL DATA (410)

$G_{hor,1}$        $G_{hor,2}$        $G_{hor,3}$ $$G_{hor} = (G_{hor,1} + G_{hor,2} + G_{hor,3})/3$$

FIG. 6

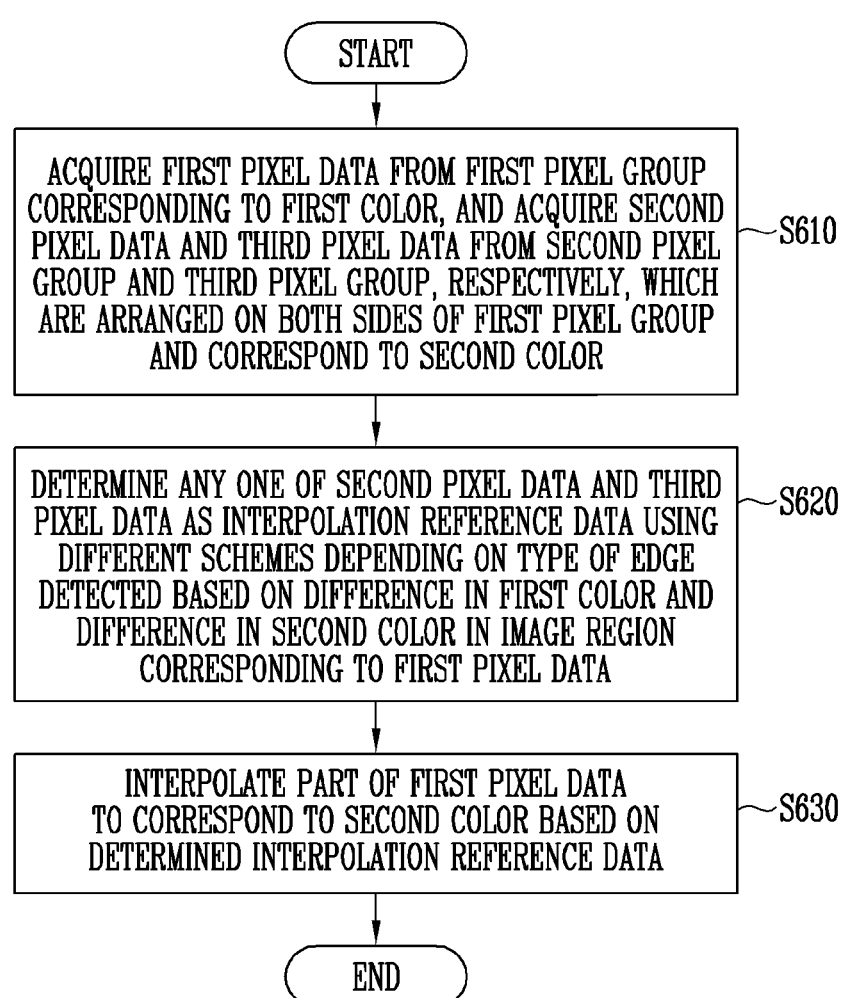

START

ACQUIRE FIRST PIXEL DATA FROM FIRST PIXEL GROUP CORRESPONDING TO FIRST COLOR, AND ACQUIRE SECOND PIXEL DATA AND THIRD PIXEL DATA FROM SECOND PIXEL GROUP AND THIRD PIXEL GROUP, RESPECTIVELY, WHICH ARE ARRANGED ON BOTH SIDES OF FIRST PIXEL GROUP AND CORRESPOND TO SECOND COLOR     ~S610

DETERMINE ANY ONE OF SECOND PIXEL DATA AND THIRD PIXEL DATA AS INTERPOLATION REFERENCE DATA USING DIFFERENT SCHEMES DEPENDING ON TYPE OF EDGE DETECTED BASED ON DIFFERENCE IN FIRST COLOR AND DIFFERENCE IN SECOND COLOR IN IMAGE REGION CORRESPONDING TO FIRST PIXEL DATA     ~S620

INTERPOLATE PART OF FIRST PIXEL DATA TO CORRESPOND TO SECOND COLOR BASED ON DETERMINED INTERPOLATION REFERENCE DATA     ~S630

END

FIG. 8
801
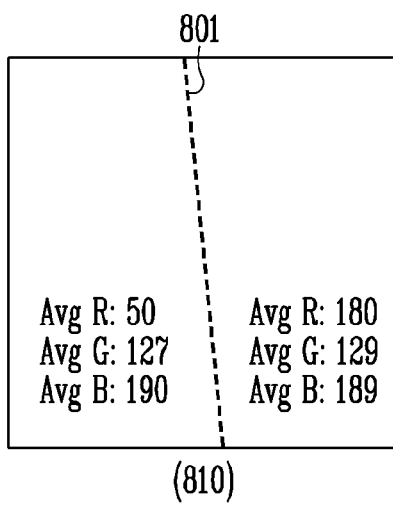
(810)
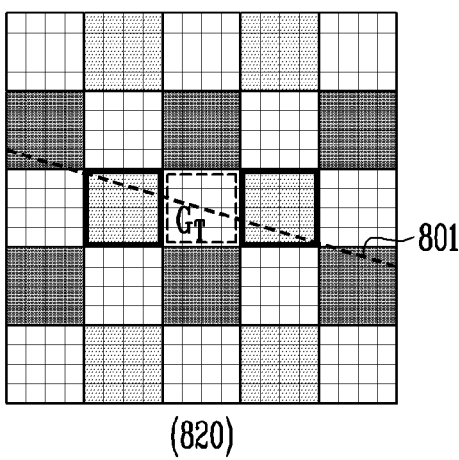
801
(820)
801
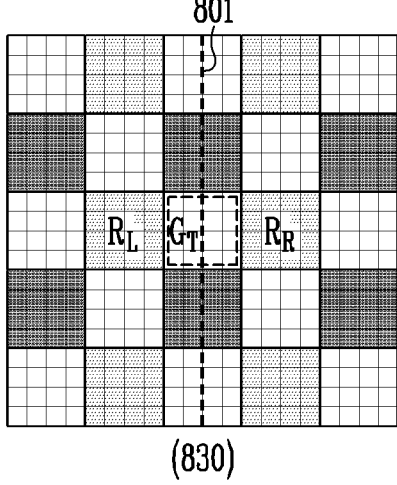
(830)

IMAGE DATA (400)

FIRST PIXEL DATA (410)

(1210)                 (1220)

(1230)                 (1240)

$$G_{hor\_1} = \left(G_{hor\_1,1} + G_{hor\_1,2} + G_{hor\_1,3}\right)/3$$

$$G_{hor\_2} = \left(G_{hor\_2,1} + G_{hor\_2,2} + G_{hor\_2,3}\right)/3 \quad\Big\} \quad G_{hor} = \left(G_{hor\_1} + G_{hor\_2} + G_{hor\_3}\right)/3$$

$$G_{hor\_3} = \left(G_{hor\_3,1} + G_{hor\_3,2} + G_{hor\_3,3}\right)/3$$

(1410)

(1420)

(1430)

(1440)

(1450)

IMAGE PROCESSING DEVICE AND IMAGE PROCESSING METHOD

CROSS-REFERENCE TO RELATED APPLICATION

The present application claims priority under 35 U.S.C. § 119(a) to Korean patent application number 10-2022-0178124 filed on Dec. 19, 2022, in the Korean Intellectual Property Office, the entire disclosure of which is incorporated by reference herein.

BACKGROUND

1. Technical Field

Various embodiments of the present disclosure generally relate to a device and method for performing remosaic processing on image data.

2. Related Art

Recently, by a demand for a high-pixel image sensor, an image sensor having a form in which two or more pixels are arranged below color filters of the same color has been developed. For example, unlike an image sensor based on a typical Bayer pattern corresponding to one pixel for each color filter, an image sensor based on an n-cell pattern corresponding to 4×4 pixels for each color filter is present.

An image signal processor (ISP), which receives a raw image from the image sensor based on an n-cell pattern, may perform a remosaic operation of converting the raw image into a typical RGB image such as a Bayer pattern image. As a remosaic scheme, interpolation may be used.

Compared to the image sensor based on the Bayer pattern, the image sensor based on the n-cell pattern is characterized in that the distance between pixels corresponding to color filters of the same color is long. Therefore, as a remosaic scheme for image data (e.g., a raw image) output from the image sensor based on the n-cell pattern, simple linear interpolation may not be sufficient.

SUMMARY

Various embodiments of the present disclosure are directed to an image processing device and an image processing method, which use different interpolation schemes depending on the characteristics of an edge included in an image.

An embodiment of the present disclosure may provide for an image processor. The image processor may include: an acquirer configured to acquire first pixel data from a first pixel group corresponding to a first color, and acquire second pixel data and third pixel data from a second pixel group and a third pixel group, respectively, which are arranged on both sides of the first pixel group and correspond to a second color distinguished from the first color; a determiner configured to determine any one of the second pixel data and the third pixel data as interpolation reference data using different schemes depending on a type of edge that is detected based on a difference in the first color and a difference in the second color in an image region corresponding to the first pixel data; and an interpolator configured to interpolate a part of the first pixel data to correspond to the second color based on the determined interpolation reference data.

An embodiment of the present disclosure may provide for an image processing method. The image processing method may include: acquiring first pixel data from a first pixel group corresponding to a first color, and acquiring second pixel data and third pixel data from a second pixel group and a third pixel group, respectively, which are arranged on both sides of the first pixel group and correspond to a second color distinguished from the first color; determining any one of the second pixel data and the third pixel data as interpolation reference data using different schemes depending on a type of edge that is detected based on a difference in the first color and a difference in the second color in an image region corresponding to the first pixel data; and interpolating a part of the first pixel data to correspond to the second color based on the determined interpolation reference data.

An embodiment of the present disclosure may provide for an electronic device. The electronic device may include: an image sensor including a first pixel group corresponding to a first color and a second pixel group and a third pixel group, which are arranged on both sides of the first pixel group and correspond to a second color distinguished from the first color; an acquirer configured to acquire image data including first pixel data acquired from the first pixel group, second pixel data acquired from the second pixel group, and third pixel data acquired from the third pixel group; a determiner configured to determine any one of the second pixel data and the third pixel data as interpolation reference data using different schemes depending on a type of edge that is detected based on a difference in the first color and a difference in the second color in an image region corresponding to the first pixel data based on the image data; and an interpolator configured to interpolate a part of the first pixel data to correspond to the second color based on the determined interpolation reference data.

BRIEF DESCRIPTION OF THE DRAWINGS

FIG. 4 is a diagram illustrating a scheme for interpolating a part of first pixel data, corresponding to a first color, to correspond to a second color according to an embodiment of the present disclosure.

FIG. 6 is a flowchart illustrating a method of performing remosaic processing using a first scheme or a second scheme respectively corresponding to a first edge or a second edge according to an embodiment of the present disclosure.

FIG. 8 is a diagram illustrating an example of a first edge according to an embodiment of the present disclosure.

3

Figure 10:
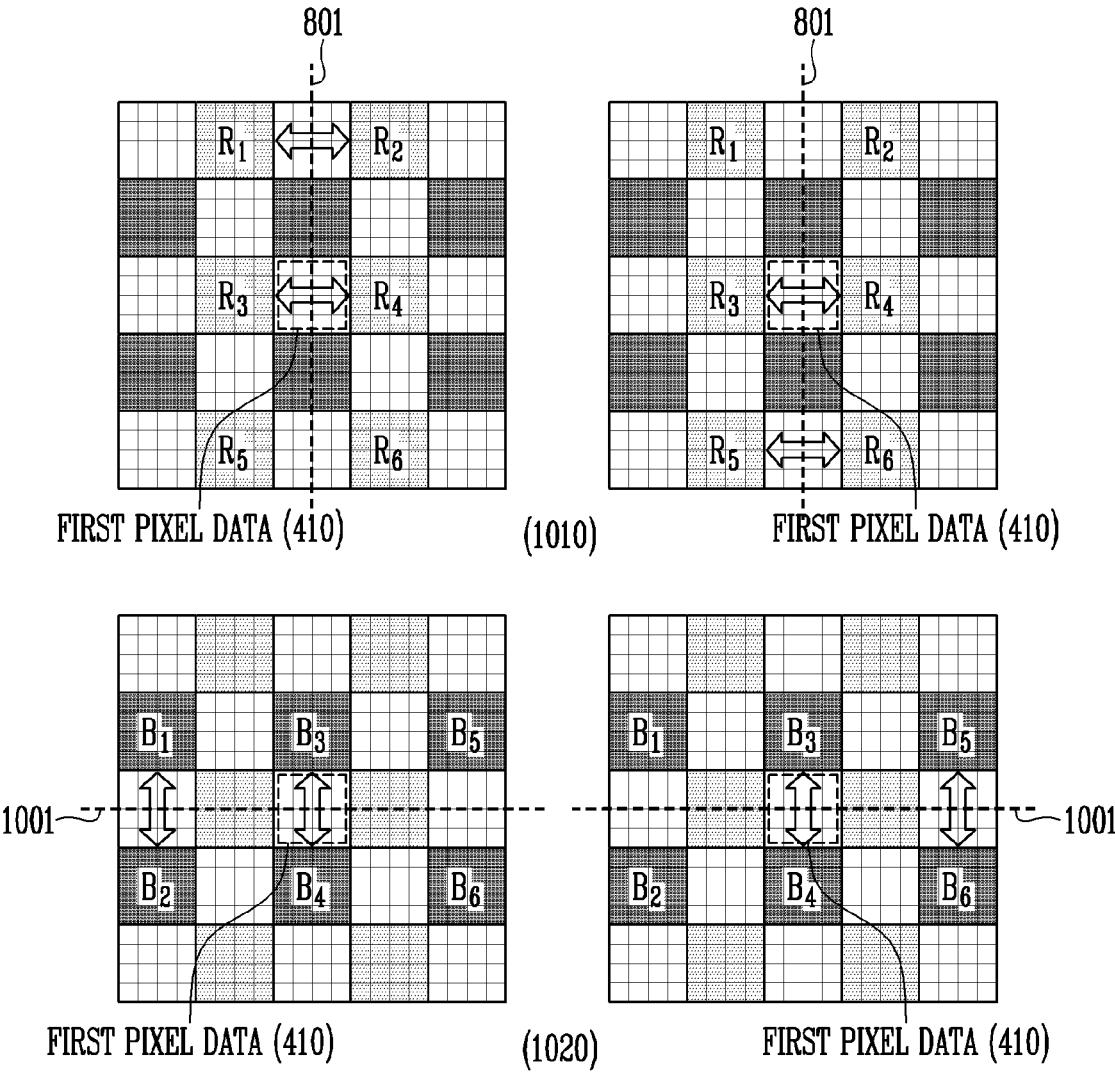

FIG. 10 is a diagram illustrating a method of determining whether a first edge is present in an image region when first pixel data is similar to neighboring pixel data according to an embodiment of the present disclosure.

Figure 11:
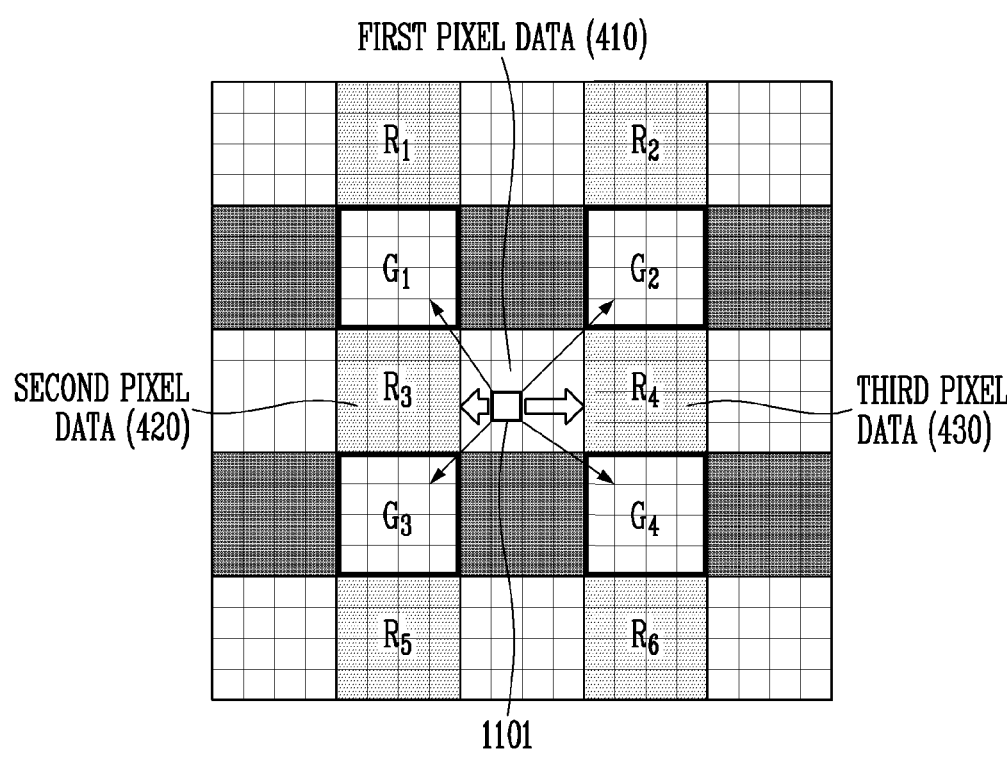

FIG. 11 is a diagram illustrating a method of determining interpolation reference data when a first edge is present in an image region according to an embodiment of the present disclosure.

Figure 12:
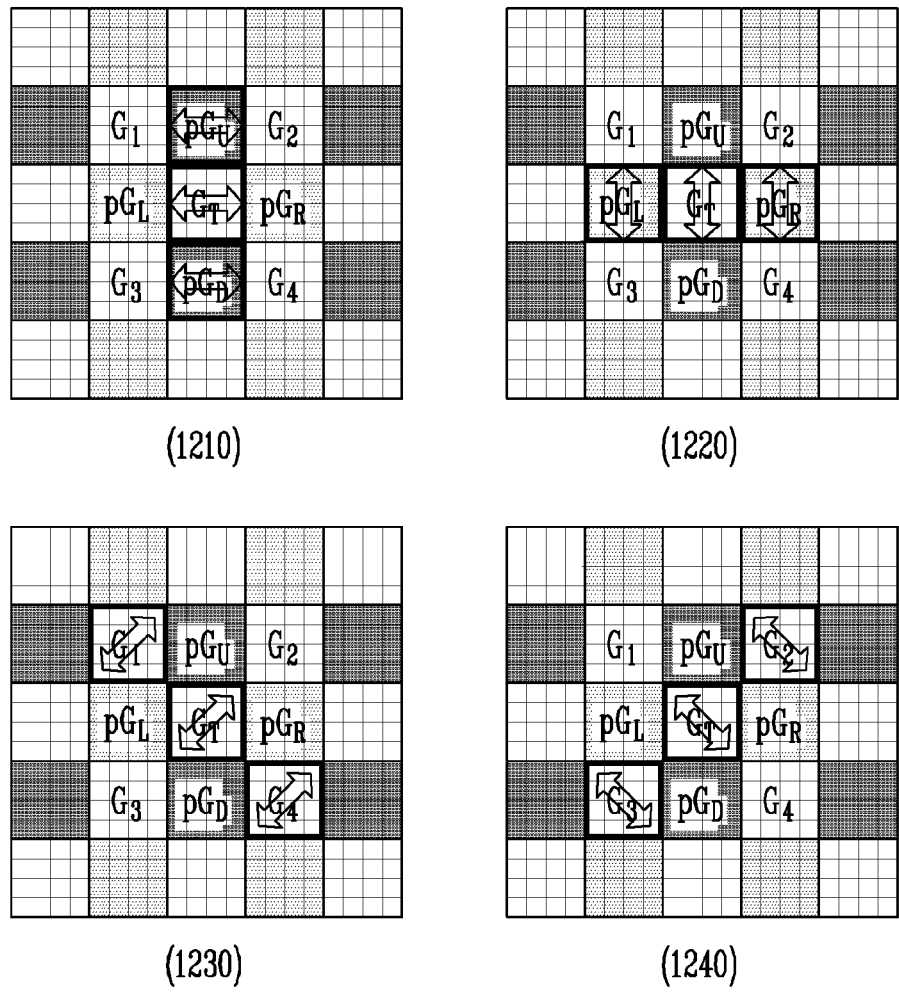

FIG. 12 is a diagram illustrating a method of determining whether a second edge is present in an image region according to an embodiment of the present disclosure.

Figure 13:
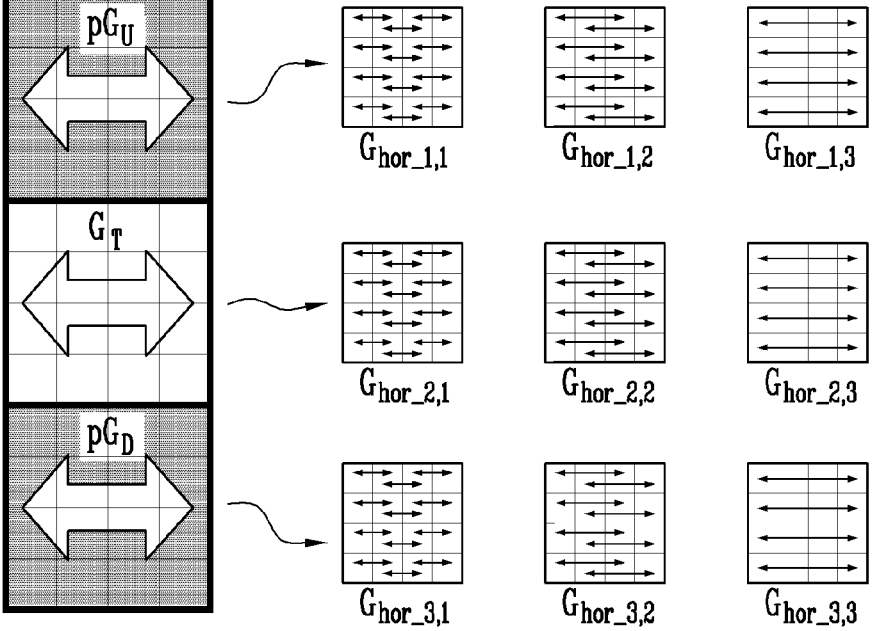

FIG. 13 is a diagram illustrating a method of determining whether a second edge is present in an image region according to an embodiment of the present disclosure.

Figure 14:
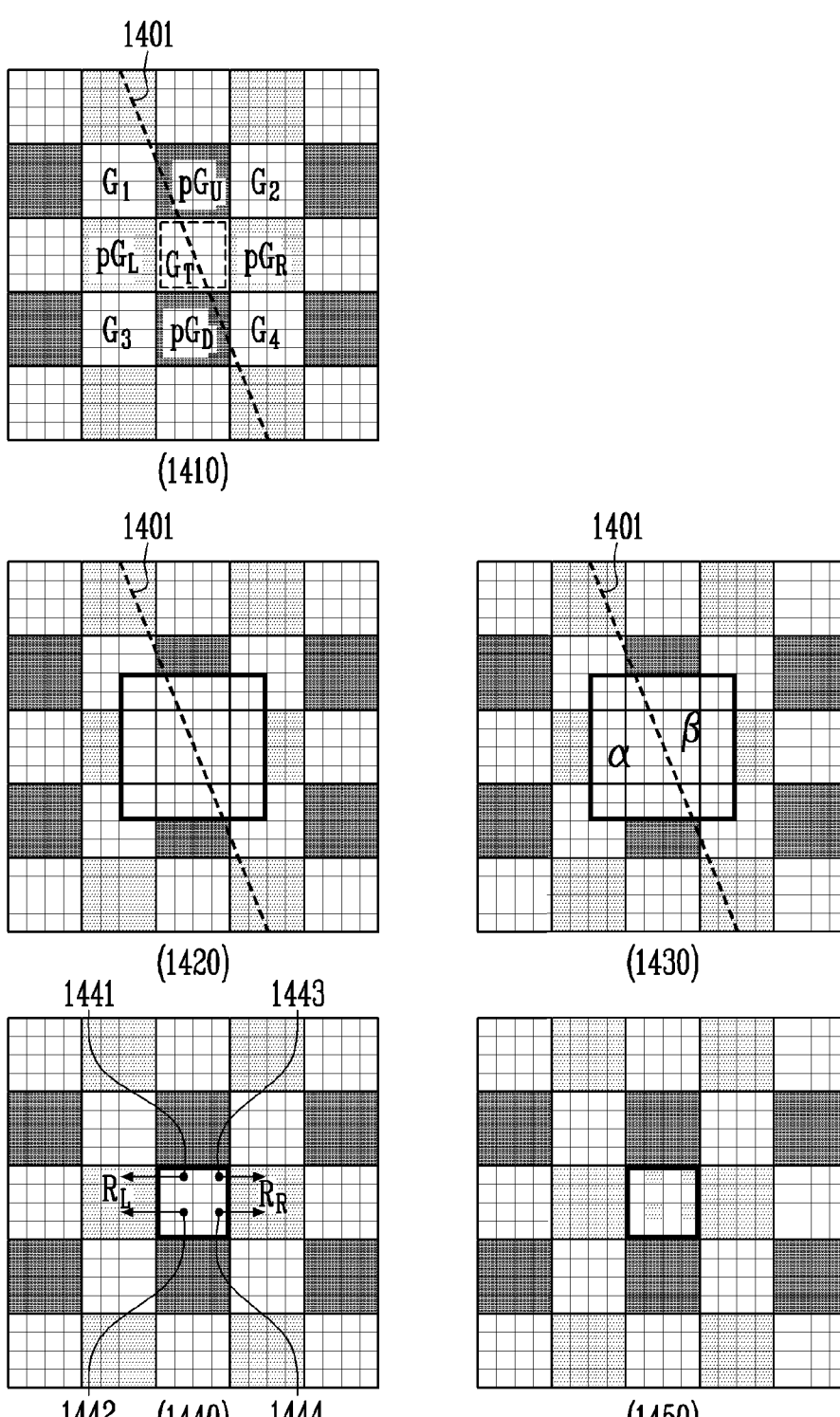

FIG. 14 is a diagram illustrating a method of determining interpolation reference data when a second edge is present in an image region according to an embodiment of the present disclosure.

DETAILED DESCRIPTION

Specific structural or functional descriptions in the embodiments of the present disclosure introduced in this specification or application are provided as examples to describe embodiments according to the concept of the present disclosure. The embodiments according to the concept of the present disclosure may be practiced in various forms, and should not be construed as being limited to the embodiments described in the specification or application.

Various embodiments of the present disclosure will now be described more fully hereinafter with reference to the accompanying drawings, in which embodiments of the present disclosure are shown, so that those skilled in the art can practice the technical spirit of the present disclosure.

Figure 1:
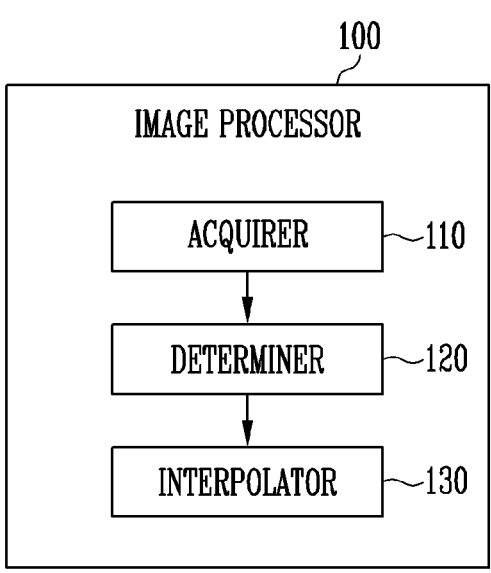
FIG. 1 is a diagram illustrating an image processor according to an embodiment of the present disclosure.

FIG. 1 is a diagram illustrating an image processor according to an embodiment of the present disclosure.

Referring to FIG. 1, an image processor 100 may include an acquirer 110, a determiner 120, and an interpolator 130. In the present disclosure, the image processor 100 may be referred to as an image processing device.

The acquirer 110 may acquire first pixel data from a first pixel group corresponding to a first color, and may acquire second pixel data and third pixel data from a second pixel group and a third pixel group, respectively, which are arranged on both sides of the first pixel group and correspond to a second color distinguished from the first color. The first pixel group, the second pixel group, and the third pixel group will be described in detail later with reference to FIG. 3.

The determiner 120 may determine any one of the second pixel data and the third pixel data as interpolation reference data using different schemes depending on the type of edge that is detected based on a difference in the first color and a difference in the second color in an image region corresponding to the first pixel data. The decision of the interpolation reference data will be described in detail below with reference to FIG. 2 and FIGS. 7 to 14.

The interpolator 130 may interpolate a part of the first pixel data to correspond to the second color based on the determined interpolation reference data. The interpolator 130 will be described in detail later with reference to FIG. 4.

Figure 2:
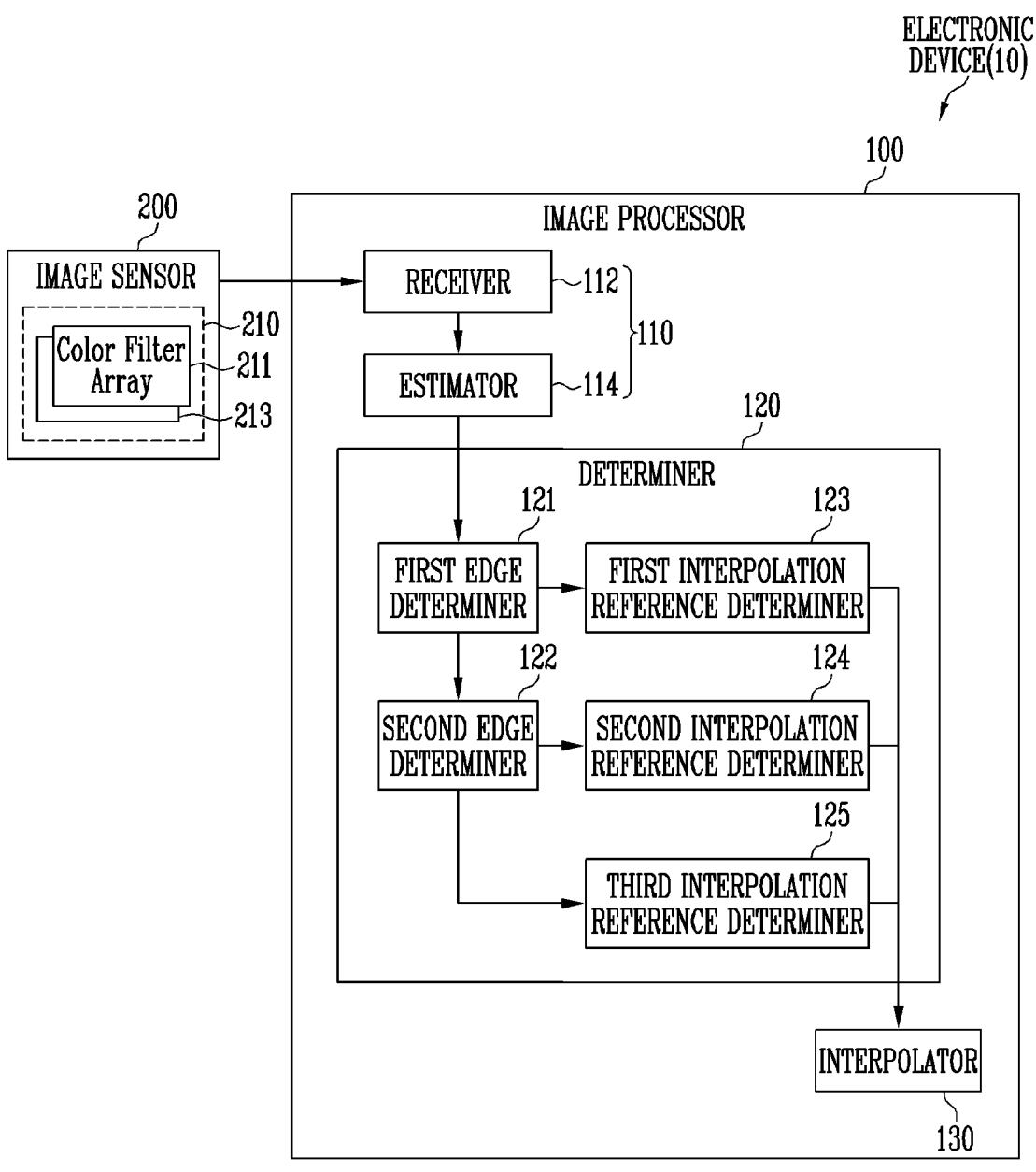
FIG. 2 is a diagram illustrating an electronic device according to an embodiment of the present disclosure.

FIG. 2 is a diagram illustrating an electronic device according to an embodiment of the present disclosure.

Referring to FIG. 2, an electronic device 10 may include an image sensor 200 and an image processor 100. For example, the electronic device 10 may be a digital camera, a mobile device, a smartphone, a tablet PC, a personal digital assistant (PDA), an enterprise digital assistant (EDA), a digital still camera, a digital video camera, a portable multimedia player (PMP), a mobile internet device (MID), a personal computer (PC), a wearable device, a vehicle, or a device including cameras corresponding to various purposes. Alternatively, the electronic device 10 of FIG. 2 may correspond to a part or a module (e.g., a camera module) mounted in other electronic devices. Further, it may be understood that the configurations of the image sensor 200 and the image processor 100 illustrated in FIG. 2 are included in an imaging system.

The image sensor 200 may be implemented as a charge-coupled device (CCD) image sensor or a complementary metal oxide semiconductor (CMOS) image sensor. The image sensor 200 may convert light information of a subject incident through a lens into an electrical signal, and may provide the electrical signal to the image processor 100. The image sensor 200 may transmit image data acquired through a plurality of pixels to the image processor 100.

Referring to FIG. 2, the image sensor 200 may include a pixel array 210. The pixel array 210 may include a plurality of pixels arranged in a row direction and a column direction. The structure of the pixel array 210 will be described in detail later with reference to FIG. 3.

The pixel array 210 may include a color filter array 211. The color filter array 211 may include color filters for allowing specific wavelengths (e.g., red, green, and blue) of light incident on respective pixels to pass therethrough. Due to the color filter array 211, pixel data acquired from each pixel may correspond to the intensity of light having a specific wavelength. Each of the plurality of pixels included in the pixel array 210 may be designated as a red pixel R, a blue pixel B, or a green pixel G depending on the type of color filter.

The pixel array 210 may include a photoelectric conversion layer 213 including a plurality of photoelectric conversion elements formed below the color filter array 211. The photoelectric conversion layer 213 may include photoelectric conversion elements corresponding to respective pixels. For example, each photoelectric conversion element may be at least one of a photodiode, a phototransistor, a photogate, or a pinned photodiode.

The image processor 100 may perform image processing on image data received from the image sensor 200. For example, the image processor 100 may perform at least one of interpolation, electronic image stabilization (EIS), tonal (hue) correction, image quality correction, or size adjustment on the image data. The image processor 100 may acquire image data, the quality of which is improved through the image processing.

Referring to FIG. 2, the image processor 100 may include a receiver 112, an estimator 114, a determiner 120, and an interpolator 130. The determiner 120 may include a first edge determiner 121, a second edge determiner 122, a first interpolation reference determiner 123, a second interpolation reference determiner 124, and a third interpolation reference determiner 125.

The receiver 112 may receive the image data from the image sensor 200. The receiver 112 may acquire first pixel data from a first pixel group corresponding to a first color, and may acquire second pixel data and third pixel data from a second pixel group and a third pixel group, respectively, which are arranged on both sides of the first pixel group and correspond to a second color distinguished from the first color. The first pixel data, the second pixel data, and the third pixel data will be described in detail later with reference to FIG. 4.

The estimator 114 may acquire first estimated pixel data and second estimated pixel data respectively corresponding to the second pixel group and the third pixel group based on pixel data corresponding to the first color included in the image data. The first estimated pixel data and the second estimated pixel data will be described in detail later with reference to FIG. 4.

It may be understood that the receiver 112 and the estimator 114 are components included in the acquirer 110 of FIG. 1.

The determiner 120 may determine interpolation reference data using different schemes depending on the type of edge that is detected in an image region based on the image data. The edge determiner (e.g., the first edge determiner 121 or the second edge determiner 122) may determine, based on the image data, whether an edge is present in a specific image region. When an edge is present in the image region, the interpolation reference determiner (e.g., the first interpolation reference determiner 123 or the second interpolation reference determiner 124) may determine interpolation reference data using a first scheme corresponding to a first edge or a second scheme corresponding to a second edge. Further, when no edge is present in the image region, the third interpolation reference determiner 125 may determine interpolation reference data using a designated scheme. A detailed operation of the determiner 120 will be described later with reference to FIGS. 7 to 14.

The interpolator 130 may interpolate a part of the image data with another color based on the determined interpolation reference data. A detailed operation of the interpolator 130 will be described later with reference to FIG. 4.

Figure 3:
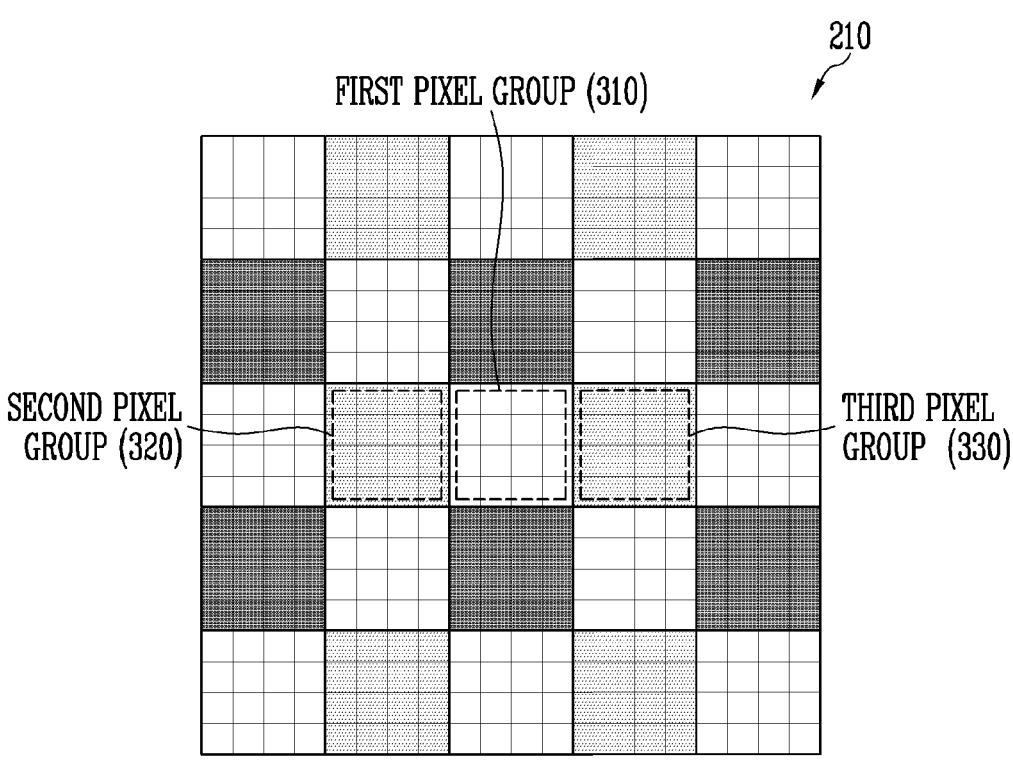
FIG. 3 is a diagram illustrating a pixel array of an image sensor according to an embodiment of the present disclosure.

FIG. 3 is a diagram illustrating a pixel array of an image sensor according to an embodiment of the present disclosure.

Referring to FIG. 3, the pixel array 210 of the image sensor 200 may include a plurality of pixels. The pixel array 210 according to the present disclosure may have an n-cell pattern in which two or more pixels correspond to each color filter included in a color filter array 211. Referring to FIG. 3, the pixel array 210 may include pixel groups, each including N×N (where N is a natural number equal to or greater than 2) pixels corresponding to each color filter. For example, the pixel array 210 may include a first pixel group 310 including 4×4 pixels corresponding to a first color (e.g., G). Also, the pixel array 210 may include a second pixel group 320 and a third pixel group 330, each including 4×4 pixels corresponding to a second color (e.g., R). The second pixel group 320 and the third pixel group 330 may be pixel groups arranged on both sides of the first pixel group 310.

The image sensor 200 may include the color filter array 211 including color filters respectively corresponding to red (R), green (G), and blue (B). In the present disclosure, the first color may indicate green (G), and the second color may indicate red (R), or blue (B). Further, in the present disclosure, a pixel corresponding to a specific color (e.g., R, G, or B) or a pixel of a specific color may be a pixel for acquiring a pixel value based on incident light passing through a color filter corresponding to the relevant color. For example, the pixel corresponding to color G (or the pixel of color G) may acquire a pixel value for the intensity of light corresponding to color G out of the incident light.

The image sensor 200 may acquire pixel values through a plurality of pixels. Furthermore, the image sensor 200 may acquire pixel data from each pixel group. It may be understood that the pixel data includes N×N pixel values. For example, the image sensor 200 may acquire first pixel data from the first pixel group 310 corresponding to the first color (e.g., color G), acquire second pixel data from the second pixel group 320 corresponding to the second color (e.g., color R), and acquire third pixel data from the third pixel group 330 corresponding to the second color. The first pixel data may include N×N pixel values corresponding to the first color, and each of the second pixel data and the third pixel data may include N×N pixel values corresponding to the second color.

The image sensor 200 may provide the image data acquired through the plurality of pixels to the image processor 100. For example, the image sensor 200 may output image data including the first pixel data acquired from the first pixel group 310, the second pixel data acquired from the second pixel group 320, and the third pixel data acquired from the third pixel group 330. The receiver 112 of the image processor 100 may receive the image data from the image sensor 200.

In the present disclosure, although 4×4 pixels are illustrated or described as being included in each pixel group (e.g., the first pixel group 310, the second pixel group 320, or the third pixel group 330) included in the pixel array 210, this illustration or description is provided for convenience of description, and the scope of the present disclosure is not limited thereto. For example, embodiments of the present disclosure may also be applied to the case where 2×2 pixels are included in each pixel group.

Furthermore, in the present disclosure, although a description has been mainly made based on the case where the second color is red (R), this description is provided for convenience of description, and embodiments of the present disclosure may also be applied to the case where the second color is blue (B).

Figure 4:
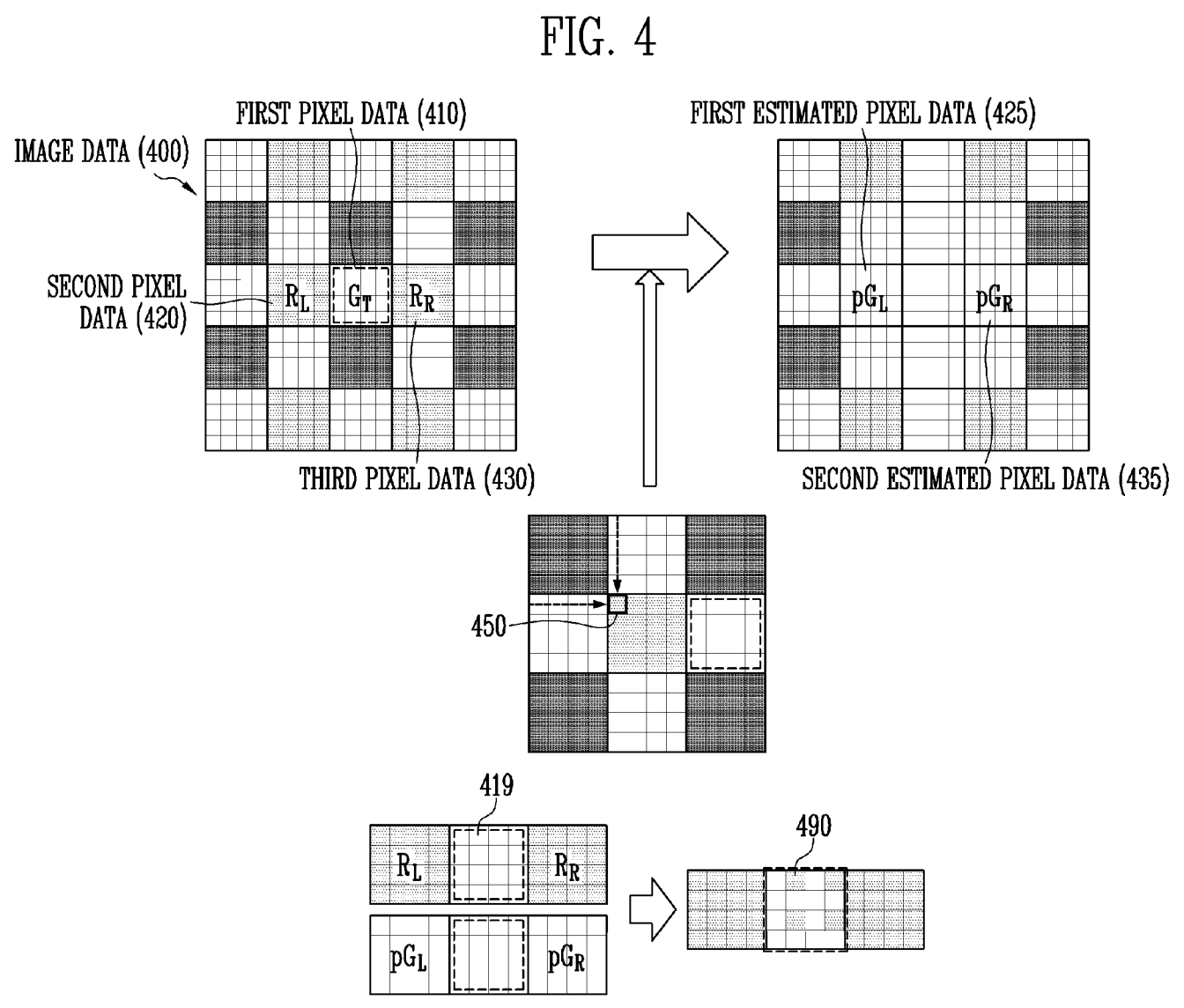

FIG. 4 is a diagram illustrating a scheme for interpolating a part of first pixel data, corresponding to a first color, to correspond to a second color according to an embodiment of the present disclosure.

Referring to FIG. 4, image data 400 may be image data described in relation to FIG. 3. For example, the image sensor 200 may acquire image data 400 including first pixel data 410 acquired from a first pixel group 310, second pixel data 420 acquired from a second pixel group 320, and third pixel data 430 acquired from a third pixel group 330. The image processor 100 (e.g., the acquirer 110) may acquire the image data 400 from the image sensor 200.

In the present disclosure, for convenience of description, the first pixel data 410 may be designated as $G_T$, the second pixel data 420 may be designated as $R_L$, and the third pixel data 430 may be designated as $R_R$. $G_T$ may refer to pixel data that is the target of interpolation. $R_L$ and $R_R$ may refer to pixel data corresponding to interpolation reference data (or a candidate for interpolation reference data) when some pixel values of $G_T$ are interpolated with color R.

The image processor 100 (e.g., the receiver 112) may receive the image data 400 from the image sensor 200. The image processor 100 (e.g., the estimator 114) may acquire first estimated pixel data 425 and second estimated pixel data 435 respectively corresponding to the second pixel group 320 and the third pixel group 330 based on pixel data corresponding to the first color G included in the image data 400. The first estimated pixel data 425 may be referred to as $pG_L$, and the second estimated pixel data 435 may be referred to as $pG_R$. The term "pG" may be an abbreviation of pseudo green, and may refer to data estimated to correspond to color R or B, other than color G, using pixel values corresponding to color G.

For example, the image processor 100 (e.g., the estimator 114) may calculate pG using normal polynomial fitting. The estimator 114 may calculate a pixel value 450 corresponding to a part of the first estimated pixel data $pG_L$ using four horizontal pixel values and four vertical pixel values based on the pixel value 450, among pixel values of color G. The estimator 114 may obtain brightness change curves in respective directions using the four horizontal pixel values and the four vertical pixel values, and may acquire the pixel value 450 using the obtained brightness change curves.

The estimator 114 may acquire pG corresponding to pixel groups of colors R and B other than color G in addition to the second pixel group 320 or the third pixel group 330. For example, the estimator 114 may receive the image data 400 through the receiver 112 and thereafter estimate G values for the entire region of the image data 400. By means of this estimation, the estimator 114 may acquire a G plane having the same resolution as the image data 400. The G plane may include G data acquired from pixels of color G and pG data estimated using the G data.

Referring to FIG. 4, the image processor 100 (e.g., the interpolator 130) may interpolate some pixel value 419 of the first pixel data 410 based on the second pixel data 420, the third pixel data 430, the first estimated pixel data 425, and the second estimated pixel data 435. The image processor 100 (e.g., the interpolator 130) may interpolate some pixel value 419 of the first pixel data 410 using the ratio $(R_L/pG_L)$ of the second pixel data 420 to the first estimated pixel data 425 and the ratio $(R_R/pG_R)$ of the third pixel data 430 to the second estimated pixel data 435. For example, the interpolator 130 may use the ratio of the average of the N×N pixel values included in the second pixel data 420 to the average value of the N×N pixel values included in the first estimated pixel data 425, that is, $R_L/pG_L$. Further, the image processor 100 (e.g., the interpolator 130) may also use the ratio of the average of the N×N pixel values included in the third pixel data 430 to the average value of the N×N pixel values included in the second estimated pixel data 435, that is, $R_R/pG_R$.

The image processor 100 (e.g., the interpolator 130) may acquire a pixel value 490 interpolated to correspond to color R by multiplying R/pG by some pixel value 419 of $G_T$. Here, the image processor 100 (e.g., the interpolator 130) may obtain the interpolated pixel value 490 by multiplying $R_L/pG_L$ by the pixel value 419 that is the target of interpolation, by multiplying $R_R/pG_R$ by the pixel value 419, or by exploiting both $R_L/pG_L$ and $R_R/pG_R$, depending on what is the interpolation reference data. In an example, when interpolation reference data corresponding to the pixel value 419 that is the target of interpolation is determined as the second pixel data 420, the interpolator 130 may acquire the interpolated pixel value 490 by multiplying $R_L/pG_L$ by the pixel value 419. In an example, when interpolation reference data corresponding to the pixel value 419 that is the target of interpolation is determined as the third pixel data 430, the interpolator 130 may acquire the interpolated pixel value 490 by multiplying $R_R/pG_R$ by the pixel value 419. In an example, when interpolation reference data corresponding to the pixel value 419 that is the target of interpolation is determined as the second pixel data 420 and the third pixel data 430, the interpolator 130 may also acquire the interpolated pixel value 490 by multiplying a separate ratio R/pG, which is calculated based on $R_L/pG_L$ and $R_R/pG_R$ depending on the ratio, by the pixel value 419.

That is, the image processor 120 according to the present disclosure may determine the interpolation reference data using a predefined scheme through the determiner 120, and may interpolate the pixel value 419 that is the target of interpolation based on the determined interpolation reference data through the interpolator 130. Therefore, for the interpolator 130 to interpolate a part of the first pixel data 410 with the second color R or B, an operation of determining the interpolation reference data through the determiner 120 needs to be performed in advance. Hereinafter, a method in which the determiner 120 determines interpolation reference data when a part of the pixel data of color G is interpolated with color R or B, in particular, a method in which the determiner 120 determines interpolation reference data near an edge included in a captured scene will be described.

Figure 5:
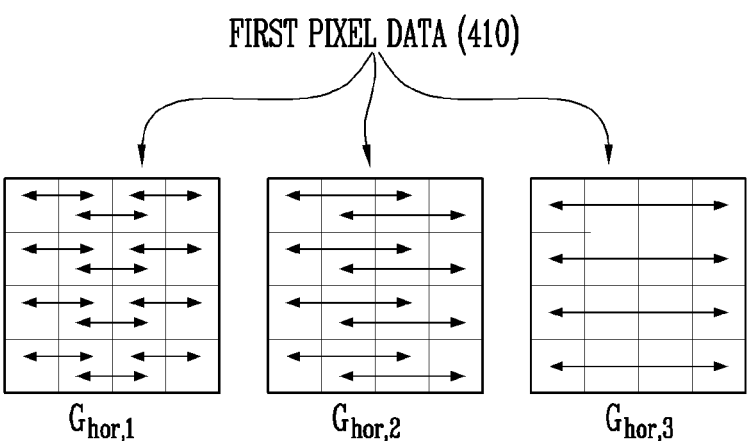
FIG. 5 is a diagram illustrating a scheme in which an image processor calculates the gradient of the corresponding pixel group based on pixel data according to an embodiment of the present disclosure.

FIG. 5 is a diagram illustrating a scheme in which an image processor calculates the gradient of the corresponding pixel group based on pixel data according to an embodiment of the present disclosure.

The image processor 100 (e.g., the determiner 120) may calculate direction-wise gradients for each pixel group. For example, the determiner 120 may calculate horizontal, vertical, right-upward diagonal, and left-upward diagonal gradients based on the pixel data acquired from respective pixel groups. As an example of this calculation, a method of calculating a horizontal gradient $G_{hor}$ included in first pixel data 410 will be described with reference to FIG. 5.

The image processor 100 (e.g., the determiner 120) may calculate the gradient based on the brightness differences between pixels present at 1 to N−1-pixel distance in a direction (e.g., a horizontal direction) in which the gradient is desired to be obtained. For example, when each pixel group includes 4×4 pixels, the image processor 100 may calculate $G_{hor,1}$, which is the average of brightness differences between pixels present at a 1-pixel distance, $G_{hor,2}$, which is the average of brightness differences between pixels present at a 2-pixel distance, and $G_{hor,3}$, which is the average of brightness differences between pixels present at a 3-pixel distance. Here, the 1-pixel distance may refer to the distance from a specific pixel to a pixel immediately adjacent to the specific pixel. In one embodiment, the image processor 100 (e.g., the determiner 120) may determine the average of $G_{hor,1}$, $G_{hor,2}$, and $G_{hor,3}$ as $G_{hor}$. That is, the horizontal gradient $G_{hor}$ included in the first pixel data 410 may be calculated using the equation $G_{hor}=(G_{hor,1}+G_{hor,2}+G_{hor,3})/3$. In another embodiment, the image processor 100 (e.g., the determiner 120) may determine the $G_{hor}$ using weights. For example, the determiner 120 may determine $(W1*G_{hor,1}+W2*G_{hor,2}+W3*G_{hor,3})$ as $G_{hor}$, where $W1+W2+W3=1$.

FIG. 6 is a flowchart illustrating a method of performing remosaic processing using a first scheme or a second scheme respectively corresponding to a first edge or a second edge according to an embodiment of the present disclosure. It may be understood that the method described in FIG. 6 is performed by an electronic device 10 or an image processor 100 included in the electronic device 10.

At step S610, an acquirer 110 may acquire first pixel data 410 from a first pixel group 310 corresponding to a first color, and may acquire second pixel data 420 and third pixel data 430 from a second pixel group 320 and a third pixel group 330, respectively, which are arranged on both sides of the first pixel group 310 and correspond to a second color. For example, the image sensor 200 may acquire image data 400 through a pixel array 210, and the image processor 100 may acquire the image data 400 from the image sensor 200 through the acquirer 110.

At step S620, a determiner 120 may determine any one of the second pixel data 420 and the third pixel data 430 as interpolation reference data using different schemes depending on the type of edge that is detected based on a difference in the first color and a difference in the second color in an image region corresponding to the first pixel data 410.

The image processor 100 (e.g., the first edge determiner 121 or the second edge determiner 122) may determine, based on the image data 400, whether any edge is present in the image region corresponding to the first pixel data 410. The edge determiner (e.g., the first edge determiner 121 or the second edge determiner 122) may determine whether any edge is present in the region corresponding to the first pixel group 310 in a scene captured through the image sensor 200. The edge may include a first edge or a second edge. The first edge may be an edge corresponding to the case where a difference in a first color G is less than a threshold value and a difference in a second color R or B is equal to or greater than the threshold value with respect to the first edge. The second edge may be an edge corresponding to the case where the difference in the first color G and the difference in the second color R or B are equal to or greater than the threshold value with respect to the second edge. A detailed method of determining whether the first edge or the second edge is included will be described in detail later with reference to FIG. 7.

The image processor 100 (e.g., the first interpolation reference determiner 123 or the second interpolation reference determiner 124) may determine any one of the second pixel data 420 and the third pixel data 430 as interpolation reference data using the first scheme corresponding to the first edge or the second scheme corresponding to the second edge in response to determination that the edge is present in the image region. The first scheme and the second scheme will be described in detail later with reference to FIG. 7.

When the edge is present in the image region, the image processor 100 (e.g., the first interpolation reference determiner 123 or the second interpolation reference determiner 124) may perform interpolation using only one of the second pixel data 420 and the third pixel data 430 rather than using both of them. When an edge is present in a specific image region, both sides of the corresponding edge may have different colors and brightness values in each captured scene. Therefore, remosaic performance may be deteriorated when interpolation is performed using pieces of pixel data on both sides having different colors and brightness values in a region in which the edge is present. When there is an edge, the image processor 100 (e.g., the first interpolation reference determiner 123 or the second interpolation reference determiner 124) according to the present disclosure may determine one of both sides to which a pixel value 419 that is the target of interpolation belongs with respect to the edge, thus enabling only one of the second pixel data 420 and the third pixel data 430 to be determined as interpolation reference data.

At step S630, the image processor 100 (e.g., the interpolator 130) may interpolate a part of the first pixel data 410 to correspond to a second color R or B based on the determined interpolation reference data. As a method of performing interpolation so that some pixel values of the first pixel data 410 corresponding to color G correspond to the second color R or B, the method described in FIG. 4 may be used.

Figure 7:
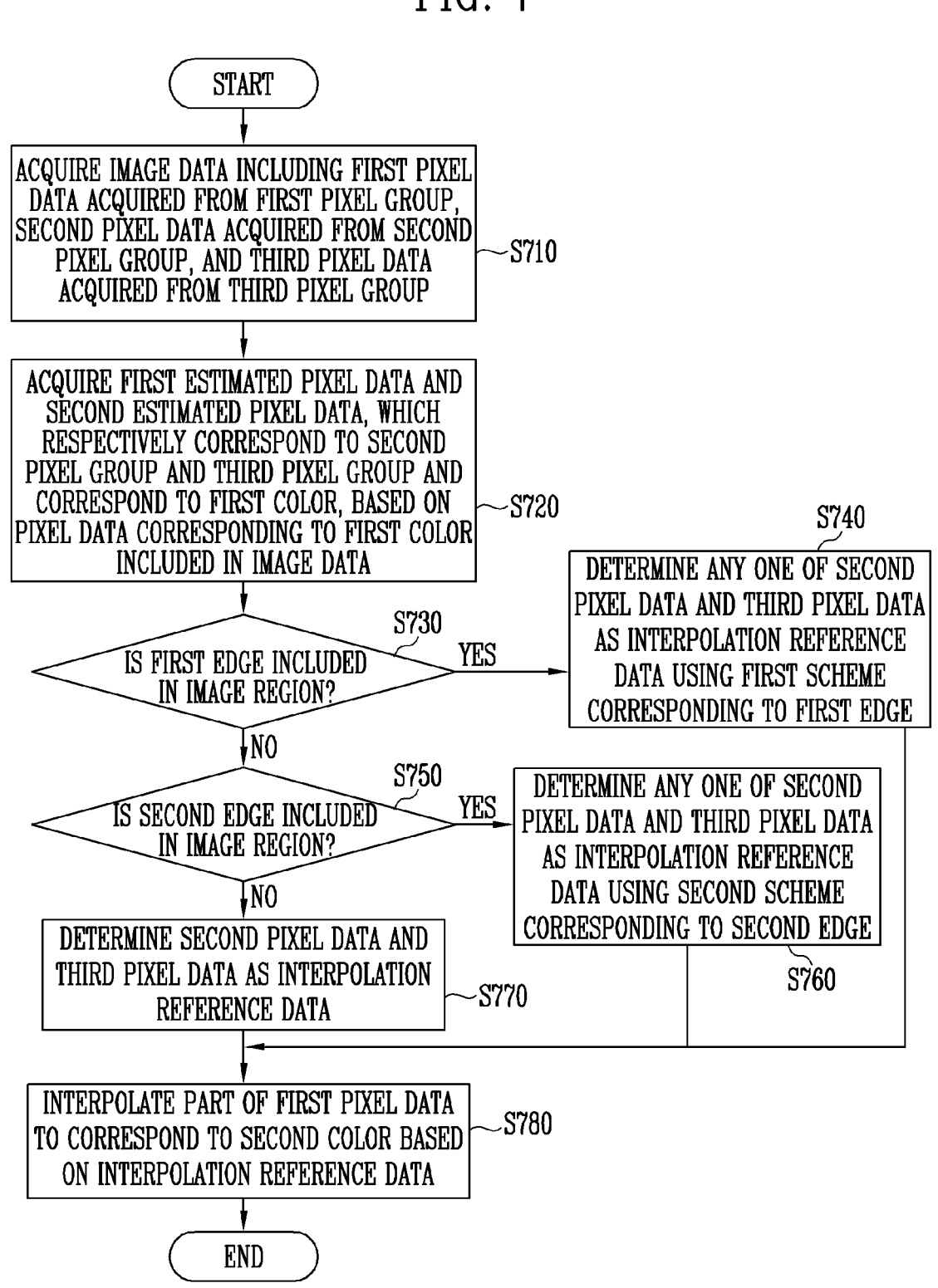
FIG. 7 is a flowchart illustrating a method of determining whether a first edge or a second edge is present in an image region according to an embodiment of the present disclosure.

Referring to FIG. 6, the image processor 100 (e.g., the determiner 120) according to the present disclosure may determine interpolation reference data using different schemes depending on whether the first edge or the second edge is present in a pixel data region $G_T$ that is the target of interpolation. That is, the electronic device 10 may not only detect an edge included in an image but also determine the characteristics of the corresponding edge. Therefore, the accuracy of decision of the interpolation reference data by the image processor 100 according to the present disclosure may be improved compared to conventional schemes. In particular, according to the present disclosure, interpolation performance may be improved even on a boundary where a difference is present only in some colors (R or B), and little difference is present in other colors. Therefore, the quality of a remosaic image acquired according to the present disclosure may be improved. In FIG. 7, the image processing method described in FIG. 6 will be described in detail.

FIG. 7 is a flowchart illustrating a method of determining whether a first edge or a second edge is present in an image region according to an embodiment of the present disclosure. It may be understood that the method described in FIG. 7 is performed by an electronic device 10 or an image processor 100 included in the electronic device 10.

At step S710, the image processor 100 (e.g., the receiver 112) may acquire image data 400 including first pixel data 410 acquired from a first pixel group 310, second pixel data 420 acquired from a second pixel group 320, and third pixel data 430 acquired from a third pixel group 330. Step S710 may correspond to step S610 of FIG. 6.

At step S720, the image processor 100 (e.g., the estimator 114) may acquire first estimated pixel data 425 and second estimated pixel data 435, which respectively correspond to the second pixel group 320 and the third pixel group 330 and correspond to the first color G, based on pixel data corresponding to a first color G included in the image data 400. As a method of acquiring estimated pixel data pG, the method described in FIG. 4 may be used.

At step S730, the image processor 100 (e.g., the first edge determiner 121) may determine, based on the image data 400, whether a first edge is present in an image region corresponding to the first pixel data 410. For example, the first edge may be an edge corresponding to the case where only a difference in color R is present or only a difference in color B is present with respect to the first edge. That is, in the present disclosure, a boundary line corresponding to the case where a difference in colors G and B is non-existent or negligibly small and a difference in color R is equal to or greater than a certain level may be referred to as the first edge. Further, a boundary line corresponding to the case where a difference in colors G and R is non-existent or negligibly small and a difference in color B is equal to or greater than a certain level may also be referred to as the first edge. An example of the first edge will be described in detail later with reference to FIG. 8. Also, an example of a detailed method of determining whether the first edge is present will be described later with reference to FIGS. 9 and 10.

At step S740, in response to determination by the first edge determiner 121 that the first edge is present in the image region, the image processor 100 (e.g., the first interpolation reference determiner 123) may determine any one of the second pixel data 420 and the third pixel data 430 as interpolation reference data using a first scheme corresponding to the first edge. A detailed example of the first scheme will be described later with reference to FIG. 11.

At step S750, in response to determination that no first edge is present in the image region, the processor 100 (e.g., the second edge determiner 122) may determine whether a second edge is present in the image region. For example, the second edge may be an edge corresponding to the case where a difference of a certain level or more is present in all of colors R, G, and B with respect to the second edge. An example of a detailed method of determining whether a second edge is present will be described later with reference to FIGS. 12 and 13.

At step S760, in response to determination by the second edge determiner 122 that the second edge is present in the image region, the image processor 100 (e.g., the second interpolation reference determiner 124) may determine any one of the second pixel data 420 and the third pixel data 430 as interpolation reference data using a second scheme corresponding to the second edge. A detailed example of the second scheme will be described later with reference to FIG. 14.

At step S770, in response to determination that no second edge is present in the image region, the image processor 100 (e.g., the third interpolation reference determiner 125) may determine the second pixel data 420 and the third pixel data 430 as the interpolation reference data. When it is determined at steps S730 and S750 that neither the first edge nor the second edge are present in the image region, the image region may be a region including no edges. Therefore, the third interpolation reference determiner 125 may perform interpolation by referring to the second pixel data 420 and the third pixel data 430 together.

At step S780, the image processor 100 (e.g., the interpolator 130) may interpolate a part of the first pixel data 410 to correspond to the second color R or B based on the determined interpolation reference data. Step S780 may correspond to step S630 of FIG. 6.

FIG. 8 is a diagram illustrating an example of a first edge according to an embodiment of the present disclosure.

Reference numeral 810 denotes an example of a first edge 801. The first edge 801 may be an edge corresponding to the case where a difference in a first color G is less than a threshold value and a difference in a second color R is equal to or greater than the threshold value with respect to the first edge 801.

For example, in the case of a left region with respect to the first edge 801 in reference numeral 810, an R value may be 50, a G value may be 127, and a B value may be 190, and in the case of a right region with respect to the first edge 801, an R value may be 180, a G value may be 129, and a B value may be 189. According to reference numeral 810, the difference between R values is 130 and is equal to or greater than a certain level with respect to the first edge 801, but the difference between G values is 2 and the difference between B values is 1, showing only the difference less than the certain level. As in the case of reference numeral 810, when the difference in color R is equal to or greater than the certain level and the difference in colors G and B is non-existent or negligibly small with respect to the edge, the edge may correspond to the first edge 801.

In reference numeral 810, the first edge 801 corresponding to the case where a difference in color R is large and a difference in colors G and B is small with respect to the edge has been described, but even an edge corresponding to the case where a difference in color B is large and a difference in colors R and G is small with respect to the edge may correspond to the first edge. That is, the first edge in the present disclosure may refer to the edge corresponding to the case where the difference in color R or B is meaningful with respect to the first edge, but the difference in the two remaining colors is not large. However, for convenience of description, the first edge 801 illustrated in FIG. 8 is described on the assumption that the difference in color R is equal to or greater than the threshold value and the difference in colors G and B is less than the threshold value with respect to the first edge 801.

Compared to the case where all of the differences in colors R, G, and B are equal to or greater than a certain level with respect to an edge (e.g., the second edge), the first edge 801 shows that the difference in colors G and B is very small with respect to the first edge 801, thus making it difficult for the electronic device to identify the presence or position of the first edge 801 using a conventional remosaic scheme.

For example, in the case of reference numeral 820, the first edge 801 passes through a pixel data region corresponding to color R, and thus the image processor 100 (e.g., the first edge determiner 121) may identify the position of the first edge 801 based on the second pixel data 420 and the third pixel data 430. However, in the case of reference numeral 830, the first edge 801 does not pass through a pixel data region corresponding to color R, and passes through only pixel data regions corresponding to colors G and B, thus making it difficult to identify the position of the first edge 801 using the conventional scheme. When an accurate position of the first edge 801 is not identified, the accuracy of interpolation for pixel values of color G may be decreased.

Figure 9:
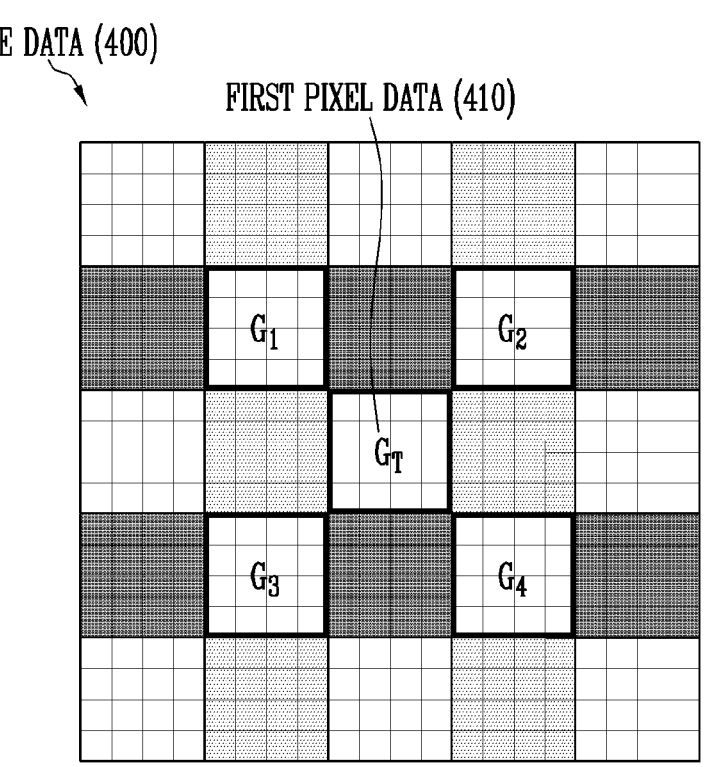
FIG. 9 is a diagram illustrating a method of identifying a similarity between first pixel data and neighboring pixel data so as to determine whether a first edge is present in an image region according to an embodiment of the present disclosure.

However, the present disclosure may identify the presence and position of the first edge 801 even in situations corresponding not only to reference numeral 820 but also to reference numeral 830 using the method to be described in FIGS. 9 and 10, and may improve interpolation performance near the first edge 801 using the method to be described in FIG. 11.

FIG. 9 is a diagram illustrating a method of identifying a similarity between first pixel data and neighboring pixel data so as to determine whether a first edge is present in an image region according to an embodiment of the present disclosure.

Referring to FIG. 9, image data 400 acquired by an image processor 100 from an image sensor 200 may include first pixel data 410 ($G_T$) and pieces of pixel data $G_1$, $G_2$, $G_3$, and $G_4$ acquired from pixel groups, which are arranged within a first distance from a first pixel group 310 and correspond to a first color G.

The image processor 100 (e.g., the first edge determiner 121) may identify similarities between the first pixel data 410 ($G_T$) and the pieces of pixel data $G_1$, $G_2$, $G_3$, and $G_4$, acquired from the pixel groups, which are arranged within the first distance from the first pixel group 310 and correspond to the first color G. The image processor 100 (e.g., the first edge determiner 121) may identify the similarities based on the difference between average brightness values of $G_T$ and $G_1$ (or $G_2$, $G_3$, or $G_4$) or the difference between gradient directions thereof.

For example, the first edge determiner 121 may identify whether the difference between the average brightness value of pixel values included in $G_1$ (or $G_2$, $G_3$, or $G_4$) and the average brightness value of pixel values included in $G_T$ is less than a threshold value. In an example, the first edge determiner 121 may identify whether the direction of a largest gradient (hereinafter referred to as a representative gradient) among the gradients in four directions calculated based on $G_1$ (or $G_2$, $G_3$, or $G_4$) matches the direction of a representative gradient calculated based on $G_T$.

The image processor 100 (e.g., the first edge determiner 121) may determine that $G_1$ (or $G_2$, $G_3$, or $G_4$) is similar to $G_T$ in the case where the difference between the average brightness value of the pixel values included in $G_1$ (or $G_2$, $G_3$, or $G_4$) and the average brightness value of the pixel values included in $G_T$ is less than a threshold value, and the direction of the representative gradient calculated based on $G_1$ (or $G_2$, $G_3$, or $G_4$) matches the direction of the representative gradient calculated based on $G_T$.

The image processor 100 (e.g., the first edge determiner 121)

may determine whether there is a first edge 801 with reference to FIG. 10 when it is determined that all of $G_1$, $G_2$, $G_3$, and $G_4$ are similar to $G_T$.

The image processor 100 (e.g., the first edge determiner 121) may determine that no first edge 801 is present in the image region corresponding to the first pixel data 410 when it is determined that at least one of $G_1$, $G_2$, $G_3$, or $G_4$ is not similar to $G_T$. Because the case where it is determined that at least one of $G_1$, $G_2$, $G_3$, or $G_4$ is not similar to $G_T$ corresponds to the case of 'No' at step S730 of FIG. 7, the image processor 100 (e.g., the second edge determiner 122) may determine that a second edge is present in the image region at step S750.

FIG. 10 is a diagram illustrating a method of determining whether a first edge is present in an image region when first pixel data is similar to neighboring pixel data according to an embodiment of the present disclosure.

When it is determined that first pixel data 410 ($G_T$) is similar to pieces of pixel data $G_1$, $G_2$, $G_3$, and $G_4$ acquired from pixel groups, which are arranged within a first distance from a first pixel group 310 and correspond to a first color G, as described above with reference to FIG. 9, the image processor 100 (e.g., the first edge determiner 121) may determine whether a first edge 801 or 1001 is present in the image region corresponding to the first pixel data 410, through the method that is described in FIG. 10.

Referring to reference numeral 1010 in FIG. 10, the first edge determiner 121 may identify similarities between pieces of pixel data $R_1$, $R_2$, $R_3$, $R_4$, $R_5$, and $R_6$, acquired from pixel groups, which are arranged within a second distance from the first pixel group 310 and correspond to a second color R.

For example, the first edge determiner 121 may identify similarities between the pieces of pixel data $R_1$, $R_2$, $R_3$, and $R_4$. When it is determined that the difference between brightness values of $R_1$ and $R_2$ and the difference between brightness values of $R_3$ and $R_4$ are equal to or greater than a threshold value, and the difference between the brightness values of $R_1$ and $R_3$ and the difference between the brightness values of $R_2$ and $R_4$ are less than the threshold value, the first edge determiner 121 may determine that a first edge 801 in a vertical direction is present in an image region corresponding to the first pixel data 410.

When it is not determined that the first edge 801 is present in the image region as a result of identifying the similarities between $R_1$, $R_2$, $R_3$, and $R_4$, the first edge determiner 121 may identify similarities between $R_3$, $R_4$, $R_5$, and $R_6$. When it is determined that the difference between brightness values of $R_3$ and $R_4$ and the difference between brightness values of $R_5$ and $R_6$ are equal to or greater than a threshold value, and the difference between the brightness values of $R_3$ and $R_5$ and the difference between the brightness values of $R_4$ and $R_6$ are less than the threshold value, the first edge determiner 121 may determine that a first edge 801 in a vertical direction is present in an image region corresponding to the first pixel data 410.

Referring to reference numeral 1020 in FIG. 10, the first edge determiner 121 may identify similarities between pieces of pixel data $B_1$, $B_2$, $B_3$, $B_4$, $B_5$, and $B_6$, acquired from pixel groups, which are arranged within a second distance from the first pixel group 310 and correspond to a second color B. Unlike the first edge 801, a first edge 1001 in reference numeral 1020 may be an edge corresponding to the case where a difference in color B is equal to or greater than a threshold value and a difference in colors R and G is less than the threshold value.

For example, the first edge determiner 121 may identify similarities between the pieces of pixel data $B_1$, $B_2$, $B_3$, and $B_4$. When it is determined that the difference between brightness values of $B_1$ and $B_2$ and the difference between brightness values of $B_3$ and $B_4$ are equal to or greater than a threshold value, and the difference between the brightness values of $B_1$ and $B_3$ and the difference between the brightness values of $B_2$ and $B_4$ are less than the threshold value, the first edge determiner 121 may determine that a first edge 1001 in a horizontal direction is present in an image region corresponding to the first pixel data 410.

When it is not determined that the first edge 1001 is present in the image region as a result of identifying the similarities between $B_1$, $B_2$, $B_3$, and $B_4$, the first edge determiner 121 may identify similarities between $B_3$, $B_4$, $B_5$, and $B_6$. When it is determined that the difference between brightness values of $B_3$ and $B_4$ and the difference between brightness values of $B_5$ and $B_6$ are equal to or greater than a threshold value, and the difference between the brightness values of $B_3$ and $B_5$ and the difference between the brightness values of $B_4$ and $B_6$ are less than the threshold value, the first edge determiner 121 may determine that the first edge 1001 in a horizontal direction is present in an image region corresponding to the first pixel data 410.

The first edge determiner 121 may determine respective similarities between $R_1$ to $R_4$, $R_3$ to $R_6$, $B_1$ to $B_4$, and $B_3$ to $B_6$ so as to determine whether the first edge 801 or 1001 is present in the image region corresponding to the first pixel data 410. The first edge determiner 121 may determine that the first edge 801 in the vertical direction or the first edge 1001 in the horizontal direction is present in the image region based on the similarities. The image processor 100 may perform a remosaic operation through the first scheme to be described in FIG. 11 in response to determination by the first edge determiner 121 that the first edge 801 or 1001 is present in the image region. The case where the first edge determiner 121 determines that the first edge 801 or 1001 is not present in the image region based on the similarities may correspond to the case of 'No' at step S730 of FIG. 7, and thus the image processor 100 (e.g., the second edge determiner 122) may determine that a second edge is present in the image region at step S750.

FIG. 11 is a diagram illustrating a method of determining interpolation reference data when a first edge is present in an image region according to an embodiment of the present disclosure.

In FIG. 11, when the first edge determiner 121 determines that a first edge 801 or 1001 is present in an image region corresponding to first pixel data 410, a method in which the first interpolation reference determiner 123 determines any one of second pixel data 420 and third pixel data 430 as interpolation reference data depending on a first scheme is described. Here, although a method of determining interpolation reference data based on the first edge 801 corresponding to the case where a difference in color R is equal to or greater than a threshold value and a difference in colors G and B is less than the threshold value is described for convenience of description, the corresponding method may also be applied to the first edge 1001.

The first interpolation reference determiner 123 may identify a pixel group most similar to some pixel value 1101 of the first pixel data 410, among pieces of pixel data $G_1$, $G_2$, $G_3$, and $G_4$ acquired from respective pixel groups, which are arranged within a first distance from a first pixel group 310 and correspond to a first color G. When the identified most similar pixel group is adjacent to a second pixel group 320, the first interpolation reference determiner 123 may determine the second pixel data 420 ($R_3$) as interpolation reference data. Further, when the identified most similar pixel group is adjacent to a third pixel group 330, the first interpolation reference determiner 123 may determine the third pixel data 430 ($R_4$) as the interpolation reference data.

In an example, when the first edge determiner 121 determines that the first edge 801 is present in the image region based on similarities between $R_1$, $R_2$, $R_3$, and $R_4$, the first interpolation reference determiner 123 may select an average brightness value that is more similar to the pixel value 1101 between the average brightness value of $G_1$ and the average brightness value of $G_2$. When the first interpolation reference determiner 123 determines that the pixel value 1101 is more similar to the average brightness value of $G_1$, the second pixel data 420 ($R_3$) may be determined as the interpolation reference data. When the first interpolation reference determiner 123 determines that the pixel value 1101 is more similar to the average brightness value of $G_2$, the third pixel data 430 ($R_4$) may be determined as the interpolation reference data.

In an example, when the first edge determiner 121 determines that the first edge 801 is present in the image region based on similarities between $R_3$, $R_4$, $R_5$, and $R_6$, the first interpolation reference determiner 123 may select an average brightness value that is more similar to the pixel value 1101 between the average brightness value of $G_3$ and the average brightness value of $G_4$. When the first interpolation reference determiner 123 determines that the pixel value 1101 is more similar to the average brightness value of $G_3$, the second pixel data 420 ($R_3$) may be determined as the interpolation reference data. When the first interpolation reference determiner 123 determines that the pixel value 1101 is more similar to the average brightness value of $G_4$, the third pixel data 430 ($R_4$) may be determined as the interpolation reference data.

FIG. 12 is a diagram illustrating a method of determining whether a second edge is present in an image region according to an embodiment of the present disclosure. FIG. 13 is a diagram illustrating a method of determining whether a second edge is present in an image region according to an embodiment of the present disclosure.

In response to determination that a first edge 801 or 1001 is not present in the image region corresponding to first pixel data 410, the processor 100 (e.g., the second edge determiner 122) may determine whether a second edge is present in the image region. In FIGS. 12 and 13, a method in which the second edge determiner 122 determines whether a second edge is present in the image region based on the image data 400 will be described.

The second edge determiner 122 may determine whether the second edge is present in the image region, based on a gradient in a designated direction, included at least some of first pixel data $G_T$, pieces of pixel data $G_1$, $G_2$, $G_3$, and $G_4$, acquired from pixel groups, which are arranged within a first distance from the first pixel group 310 and correspond to a first color G, first estimated pixel data $pG_L$, and second estimated pixel data $pG_R$.

As described above with reference to FIG. 5, the image processor 100 may calculate direction-wise gradients for each pixel group. For example, the image processor 100 may obtain horizontal, vertical, right-upward diagonal, and left-upward diagonal gradients based on the pieces of pixel data (e.g., $G_T$, $G_1$, $G_2$, $G_3$, and $G_4$) acquired from respective pixel groups, or pieces of pixel data (e.g., $pG_R$, $pG_L$, $pG_U$, $pG_D$) estimated to correspond to respective pixel groups.

The second edge determiner 122 may identify whether a second edge is present in an image region corresponding to $G_T$ and identify the direction and position of the second edge when the second edge is present, based on the pieces of pixel data corresponding to respective pixel groups.

For example, referring to reference numeral 1210, the image processor 100 may calculate horizontal gradients included in respective pieces of pixel data based on $G_T$, $pG_U$, and $pG_D$. Referring to FIG. 13 together with FIG. 12, the image processor 100 may acquire a horizontal gradient $G_{hor\_1}$ of $pG_U$, a horizontal gradient $G_{hor\_2}$ of $G_T$, and a horizontal gradient $G_{hor\_3}$ of $pG_D$. The image processor 100 may obtain $G_{hor}$, which is the average value of $G_{hor\_1}$, $G_{hor\_2}$, and $G_{hor\_3}$.

Referring to reference numeral 1220, the image processor 100 may calculate vertical gradients included in respective pieces of pixel data based on $G_T$, $pG_L$, and $pG_R$. Similar to $G_{hor}$, the image processor 100 may acquire $G_{ver\_1}$, $G_{ver\_2}$, and $G_{ver\_3}$ calculated from $G_T$, $pG_L$, and $pG_R$, and may obtain $G_{ver}$, which is the average value of $G_{ver\_1}$, $G_{ver\_2}$, and $G_{ver\_3}$.

Referring to reference numeral 1230, the image processor 100 may calculate right-upward diagonal gradients included in respective pieces of pixel data based on $G_T$, $G_1$, and $G_4$. Similar to $G_{hor}$, the image processor 100 may acquire $G_{dia1\_1}$, $G_{dia1\_2}$, and $G_{dia1\_3}$, which are calculated from $G_T$, $G_1$, and $G_4$, respectively, and may obtain $G_{dia1}$ which is the average of $G_{dia1\_1}$, $G_{dia1\_2}$, and $G_{dia1\_3}$.

Referring to reference numeral 1240, the image processor 100 may calculate left-upward diagonal gradients included in respective pieces of pixel data based on $G_T$, $G_2$, and $G_3$. Similar to $G_{hor}$, the image processor 100 may acquire $G_{dia2\_1}$, $G_{dia2\_2}$, and $G_{dia2\_3}$, which are calculated from $G_T$, $G_2$, and $G_3$, respectively, and may obtain $G_{dia2}$ which is the average of $G_{dia2\_1}$, $G_{dia2\_2}$, and $G_{dia2\_3}$.

The second edge determiner 122 may determine whether a second edge is present in an image region corresponding to the first pixel data $G_T$ based on $G_{hor}$, $G_{ver}$, $G_{dia1}$, and $G_{dia2}$. For example, assuming that, among $G_{hor}$, $G_{ver}$, $G_{dia1}$, and $G_{dia2}$, a maximum gradient is $G_{max}$ and a minimum gradient is $G_{min}$, the second edge determiner 122 may determine that the second edge is present in the image region when the equation "$(G_{max}-G_{min})/G_{min} \geq$ threshold value" is satisfied.

When the equation "$(G_{max}-G_{min})/G_{min} \geq$ threshold value" is satisfied and then it is determined that the second edge is present in the image region, the second edge determiner 122 may determine that the vertical direction of $G_{max}$ is the direction of the second edge. In an example, when $G_{hor}$ is $G_{max}$ as in the case of reference numeral 1210 in FIG. 12, the second edge determiner 122 may determine that the second edge in a vertical direction is present in the image region. In an example, when $G_{ver}$ is $G_{max}$ as in the case of reference numeral 1220 of FIG. 12, the second edge determiner 122 may determine that the second edge in a horizontal direction is present in the image region. In an example, when $G_{dia1}$ is $G_{max}$ as in the case of reference numeral 1230 of FIG. 12, the second edge determiner 122 may determine that the second edge in a left-upward diagonal direction is present in the image region. In an example, when $G_{dia2}$ is $G_{max}$ as in the case of reference numeral 1240 of FIG. 12, the second edge determiner 122 may determine that the second edge in a right-upward diagonal direction is present in the image region.

The image processor 100 (e.g., the second interpolation reference determiner 124) may determine interpolation reference data using a second scheme corresponding to the second edge in response to determination that the second edge is present in the image region corresponding to the first pixel data $G_T$. A method in which the second interpolation reference determiner 124 determines the interpolation reference data using the second scheme will be described later with reference to FIG. 14.

When the second edge determiner 122 determines that a second edge is not present in the image region corresponding to the first pixel data $G_T$, the image region is not a region including a boundary line, and thus the image processor 100 (e.g., the third interpolation reference determiner 125) may determine both the second pixel data 420 and the third pixel data 430 as interpolation reference data, as in the case of step S770 of FIG. 7.

FIG. 14 is a diagram illustrating a method of determining interpolation reference data when a second edge is present in an image region according to an embodiment of the present disclosure.

In FIG. 14, described is a method in which the second interpolation reference determiner 124 determines interpolation reference data using a second scheme in response to determination by the second edge determiner 122 that the second edge is present in the image region corresponding to first pixel data $G_T$. In FIG. 14, when a second edge 1401 is present at a position indicated by reference numeral 1410, a method in which the image processor 100 identifies the position of the second edge 1401 and then determines the interpolation reference data based on the identified position will be described.

Referring to reference numeral 1420, the second interpolation reference determiner 124 may identify the position of the second edge 1401 in the image region based on at least some of first pixel data $G_T$, pieces of pixel data $G_1$, $G_2$, $G_3$, and $G_4$ acquired from pixel groups, which are arranged within a first distance from a first pixel group 310 and correspond to a first color G, and pieces of estimated pixel data $pG_R$, $pG_L$, $pG_U$, and $pG_D$. For example, the second interpolation reference determiner 124 may identify the position of the second edge 1401 based on 8×8 pixel values around the first pixel data $G_T$.

The second interpolation reference determiner 124 may perform image binarization based on at least some pixel values of $G_T$, $G_1$, $G_2$, $G_3$, $G_4$, $pG_R$, $pG_L$, $pG_U$, and $pG_D$. For example, the second interpolation reference determiner 124 may perform image binarization based on an Otsu's algorithm.

Referring to reference numeral 1430, the second interpolation reference determiner 124 may acquire a binarized boundary line depending on image binarization, and may determine that the binarized boundary line is the second edge 1401. The second interpolation reference determiner 124 may separate the 8×8 G values (or pG values) into two regions based on image binarization. The separated two regions may be designated as an "alpha region" and a "beta region."

Referring to reference numeral 1440, the second interpolation reference determiner 124 may determine second pixel data $R_L$ or third pixel data $R_R$ as interpolation reference data depending on whether a pixel value that is the target of interpolation, out of the first pixel data $G_T$, belongs to the alpha region or the beta region. For example, because pixel values 1441 and 1442 that are the target of interpolation are included in the alpha area, the second interpolation reference determiner 124 may determine the interpolation reference data of the pixel values 1441 and 1442 as the second pixel data $R_L$. Further, because pixel values 1443 and 1444 that are the target of interpolation are included in the beta region, the second interpolation reference determiner 124 may determine the interpolation reference data of the pixel values 1443 and 1444 as the third pixel data $R_R$. Reference numeral 1450 may indicate a form in which the pixel values 1441, 1442, 1443, and 1444 that are the target of interpolation are interpolated to correspond to color R based on the determined interpolation reference data.

However, descriptions made with reference to FIGS. 8 to 14 may correspond to examples of the method of detecting a first edge and a second edge, or examples of a first scheme and a second scheme of determining interpolation reference data depending on the characteristics of edges. In addition, various image processing methods of performing a remosaic operation through different schemes by separating the first edge from the second edge may be used.

In accordance with the present disclosure, as interpolation performance for an edge for which a difference only in some colors is large and a difference in other colors is not large is improved, the quality of a remosaiced image may be improved.

What is claimed is:

1. An image processor, comprising:
an acquirer configured to acquire first pixel data from a first pixel group corresponding to a first color, and acquire second pixel data and third pixel data from a second pixel group and a third pixel group, respectively, which are arranged on both sides of the first pixel group and correspond to a second color distinguished from the first color;
a determiner configured to determine one of the second pixel data or the third pixel data as interpolation reference data using different schemes depending on a type of edge that is detected based on a difference in the first color and a difference in the second color in an image region corresponding to the first pixel data; and
an interpolator configured to interpolate a part of the first pixel data to correspond to the second color based on the determined interpolation reference data corresponding to one of the second pixel data or the third pixel data.

2. The image processor according to claim 1, wherein the edge comprises one of:
a first edge for which the difference in the first color is less than a threshold value and the difference in the second color is equal to or greater than the threshold value, and
a second edge for which the difference in the first color and the difference in the second color are equal to or greater than the threshold value.

3. The image processor according to claim 2, wherein the determiner comprises:
an edge determiner configured to determine whether the edge is present in the image region; and
an interpolation reference determiner configured to, in response to a determination that the edge is present in the image region, determine the interpolation reference data using a first scheme corresponding to the first edge or a second scheme corresponding to the second edge.

4. The image processor according to claim 3, wherein the edge determiner comprises:

a first edge determiner configured to determine whether the first edge is present in the image region based on the first pixel data, the second pixel data, and the third pixel data; and a second edge determiner configured to, in response to a determination that no first edge is present in the image region, determine whether the second edge is present in the image region.

5. The image processor according to claim 4, wherein the first edge determiner determines whether the first edge is present in the image region, based on similarities between the first pixel data and pieces of pixel data acquired from pixel groups, which are arranged within a first distance from the first pixel group and correspond to the first color, and similarities between pieces of pixel data acquired from pixel groups, which are arranged within a second distance from the first pixel group and correspond to the second color.

6. The image processor according to claim 5, wherein the interpolation reference determiner comprises:

a first interpolation reference determiner configured to, in response to a determination by the first edge determiner that the first edge is present in the image region, identify a pixel group most similar to the part of the first pixel data among pieces of pixel data acquired from the pixel groups, which are arranged within the first distance from the first pixel group and correspond to the first color, when the most similar pixel group is adjacent to the second pixel group, determine the second pixel data as the interpolation reference data, and when the most similar pixel group is adjacent to the third pixel group, determine the third pixel data as the interpolation reference data.

7. The image processor according to claim 4, wherein the determiner comprises:

an estimator configured to acquire first estimated pixel data and second estimated pixel data respectively corresponding to the second pixel group and the third pixel group based on pixel data acquired from pixel groups corresponding to the first color, wherein the first estimated pixel data and the second estimated pixel data correspond to the first color.

8. The image processor according to claim 7, wherein the second edge determiner determines whether the second edge is present in the image region, based on a gradient in a designated direction included in at least parts of the first pixel data, pieces of pixel data acquired from pixel groups, which are arranged within a first distance from the first pixel group and correspond to the first color, the first estimated pixel data, and the second estimated pixel data.

9. The image processor according to claim 7, wherein the interpolation reference determiner comprises:

a second interpolation reference determiner configured to, in response to a determination by the second edge determiner that the second edge is present in the image region, identify a position of the second edge in the image region, based on at least parts of the first pixel data, pieces of pixel data acquired from pixel groups, which are arranged within a first distance from the first pixel group and correspond to the first color, the first estimated pixel data, and the second estimated pixel data, and determine any one of the second pixel data and the third pixel data as interpolation reference data based on the position of the second edge.

10. The image processor according to claim 3, wherein the interpolation reference determiner comprises:

a third interpolation reference determiner configured to, in response to a determination by the edge determiner that no edge is present in the image region, interpolate the part of the first pixel data to correspond to the second color based on the second pixel data and the third pixel data.

11. The image processor according to claim 1, wherein the first color is green (G).

12. The image processor according to claim 1, wherein the second color is one of red (R) and blue (B).

13. An image processing method, comprising:

acquiring first pixel data from a first pixel group corresponding to a first color, and acquiring second pixel data and third pixel data from a second pixel group and a third pixel group, respectively, which are arranged on both sides of the first pixel group and correspond to a second color distinguished from the first color;

determining any one of the second pixel data and the third pixel data as interpolation reference data using different schemes depending on a type of edge that is detected based on a difference in the first color and a difference in the second color in an image region corresponding to the first pixel data; and interpolating a part of the first pixel data to correspond to the second color based on the determined interpolation reference data.

14. The image processing method according to claim 13, wherein the edge comprises one of:

a first edge for which the difference in the first color is less than a threshold value and the difference in the second color is equal to or greater than the threshold value, and a second edge for which the difference in the first color and the difference in the second color are equal to or greater than the threshold value.

15. The image processing method according to claim 14, wherein determining the interpolation reference data comprises:

determining whether the edge is present in the image region; and in response to a determination that the edge is present in the image region, determining the interpolation reference data using a first scheme corresponding to the first edge or a second scheme corresponding to the second edge.

16. An electronic device, comprising:

an image sensor including a first pixel group corresponding to a first color and a second pixel group and a third pixel group, which are arranged on both sides of the first pixel group and correspond to a second color distinguished from the first color;

an acquirer configured to acquire image data including first pixel data acquired from the first pixel group, second pixel data acquired from the second pixel group, and third pixel data acquired from the third pixel group;

a determiner configured to determine any one of the second pixel data and the third pixel data as interpolation reference data using different schemes depending on a type of edge that is detected based on a difference in the first color and a difference in the second color in an image region corresponding to the first pixel data based on the image data; and an interpolator configured to interpolate a part of the first pixel data to correspond to the second color based on the determined interpolation reference data.

17. The electronic device according to claim 16, wherein the first pixel group includes N×N pixels, where N is a natural number equal to or greater than 2.

18. The electronic device according to claim 16, wherein the first pixel data includes N×N pixel values.

19. The electronic device according to claim 18, wherein the interpolator interpolates a part of the N×N pixel values included in the first pixel data to correspond to the second color based on the determined interpolation reference data.

20. The electronic device according to claim 19, wherein the interpolator is configured to:

acquire first estimated pixel data, which corresponds to the second pixel group and corresponds to the first color, based on pixel data corresponding to the first color and included in the image data, calculate a ratio of an average value of N×N pixel values included in the second pixel data to an average value of N×N pixel values included in the first estimated pixel data, and perform the interpolation by multiplying the ratio by the part of the N×N pixel values included in the first pixel data in response to a decision that the second pixel data is determined as the interpolation reference data.

\* \* \* \* \*